(12) United States Patent
Miura et al.

(10) Patent No.: US 7,494,741 B2
(45) Date of Patent: Feb. 24, 2009

(54) FUEL CELL WITH A POROUS ELECTRON COLLECTION LAYER FORMED BY STACKING CONDUCTIVE MATERIAL PARTICLES

(75) Inventors: Hirotsuna Miura, Fujimi-machi (JP); Yasunori Yamazaki, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 629 days.

(21) Appl. No.: 10/806,160

(22) Filed: Mar. 23, 2004

(65) Prior Publication Data

US 2004/0214072 A1   Oct. 28, 2004

(30) Foreign Application Priority Data

Apr. 2, 2003 (JP) ............... 2003-099626

(51) Int. Cl.
*H01M 4/86* (2006.01)
*H01M 4/88* (2006.01)

(52) U.S. Cl. .......................................... 429/44; 429/12
(58) Field of Classification Search .................. 429/12, 429/44
See application file for complete search history.

(56) References Cited

U.S. PATENT DOCUMENTS

| | | | |
|---|---|---|---|
| 6,037,073 A * | 3/2000 | Besmann et al. | 429/34 |
| 6,398,787 B1 * | 6/2002 | Itoman | 606/103 |
| 6,468,685 B1 | 10/2002 | Yoshida | |
| 6,667,127 B2 * | 12/2003 | Beattie et al. | 429/44 |
| 6,761,990 B1 | 7/2004 | Yoshitake et al. | |

(Continued)

FOREIGN PATENT DOCUMENTS

CN   1237004 A   12/1999

(Continued)

OTHER PUBLICATIONS

Lee et al., "Factorial Design Study of Miniature Fuel Cells with Micromachined Silicon Flow Structures", The 200th Meeting of the Electrochemical Society, Abstract No. 452.

(Continued)

*Primary Examiner*—Mark Ruthkosky
(74) *Attorney, Agent, or Firm*—Oliff & Berridge, PLC.

(57) ABSTRACT

To provide a fuel cell which has a reaction layer having good reaction efficiency and an electron collection layer to efficiently collect electrons generated at the reaction layer and of which the output density is high and the characteristic is good and a method of manufacturing thereof, a fuel cell includes a first substrate provided with a gas flow path to supply a first reaction gas; a first electron collection layer formed on the first substrate; a first reaction layer formed on the first electron collection layer; an electrolyte film formed on the first reaction layer; a second reaction layer formed on the electrolyte film; a second electron collection layer formed on the second reaction layer; and a second substrate provided with a second gas flow path to supply a second reaction gas, the fuel cell including at least one of the first electron collection layer and the second electron collection layer being constructed by stacking conductive material particles. A method of manufacturing the fuel cell includes the first and/or the second electron collection layer formed by applying material to form the electron collection layer at predetermined intervals using a discharging device.

10 Claims, 11 Drawing Sheets

U.S. PATENT DOCUMENTS

| | | |
|---|---|---|
| 6,855,178 B2 | 2/2005 | Uchida et al. |
| 6,991,870 B2 * | 1/2006 | Yasumoto et al. ............. 429/44 |
| 2003/0013602 A1 | 1/2003 | Uchida et al. |

FOREIGN PATENT DOCUMENTS

| | | |
|---|---|---|
| JP | A 06-036784 | 2/1994 |
| JP | A-8-88008 | 4/1996 |
| JP | A-2001-113141 | 4/2001 |
| JP | A 2001-196076 | 7/2001 |
| JP | A-2002-298860 | 10/2002 |
| WO | WO 00/44059 | 7/2000 |

OTHER PUBLICATIONS

Chang-Chien et al., "Planar Interconnection of Multiple Polymer Electrolyte Membrane Fuel Cells by Microfabrication", The 200th Meeting of the Electrochemical Society, Abstract No. 453.

* cited by examiner

FIG. 1
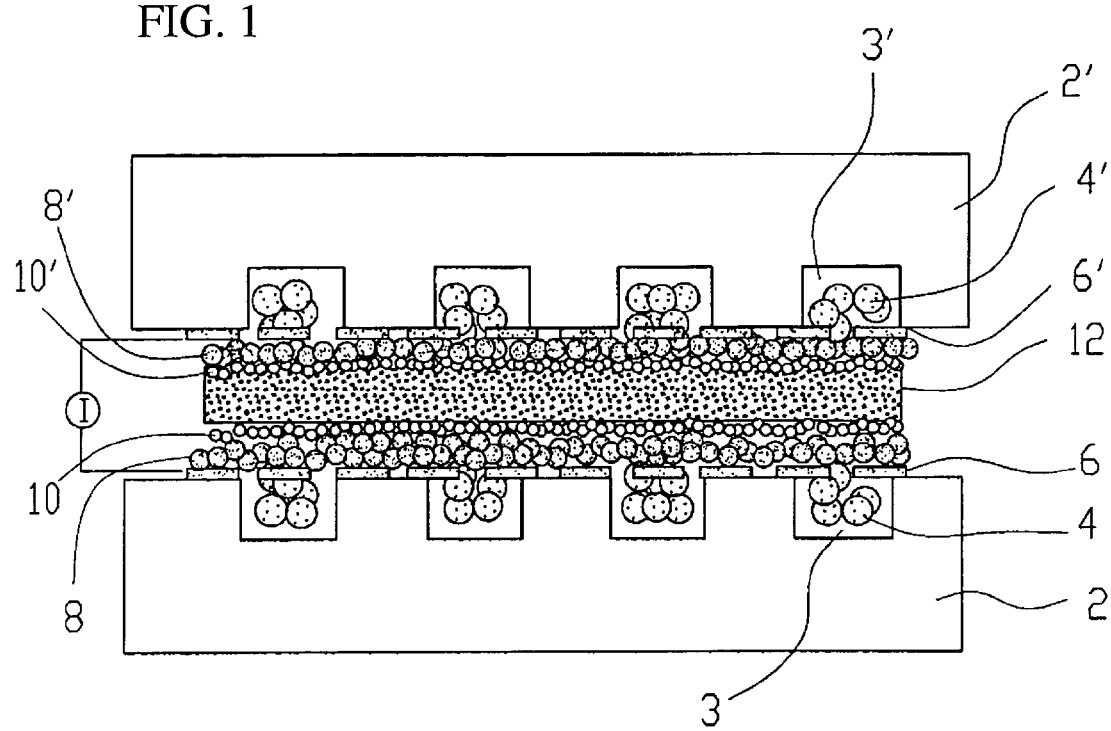
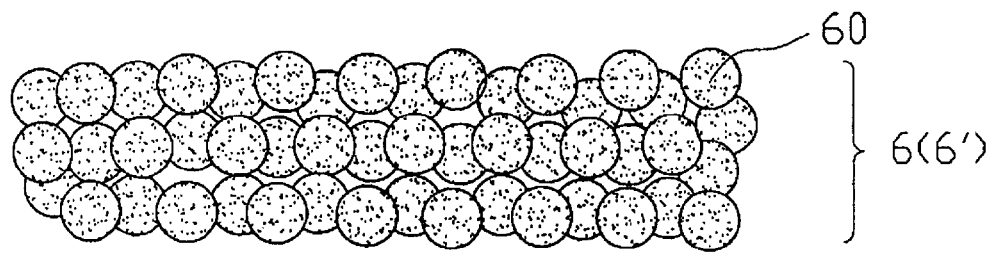
FIG. 2a
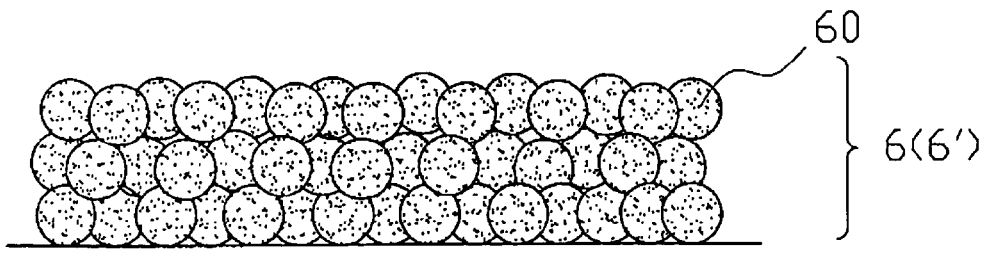
FIG. 2b

FUEL CELL WITH A POROUS ELECTRON COLLECTION LAYER FORMED BY STACKING CONDUCTIVE MATERIAL PARTICLES

BACKGROUND OF THE INVENTION

1. Field of Invention

The present invention relates to a fuel cell to supply various kinds of reaction gases to a respective electrode from the exterior and generate electricity by the reaction based on the supplied reaction gases and a method thereof, and an electronic apparatus and a vehicle having the fuel cell as a power supply source.

2. Description of Related Art

In the related art, there is a fuel cell composed of electrolyte film, an electrode (anode) positioned on one surface of the electrolyte film and an electrode (cathode) positioned on the other surface of the electrolyte film. For example, in a solid polymer electrolyte type fuel cell in which the electrolyte film is a solid polymer electrolyte film, hydrogen is divided into the hydrogen ion and electron. Thus, in the anode, the electron flows toward the side of the cathode and the hydrogen ion is moved in the electrolyte film toward the cathode, and, in the cathode, water is created from oxygen gas, hydrogen ion and electron.

In the solid electrolyte type fuel cell, each electrode is formed of a reaction layer composed of metal particles which are a reaction catalyst of the reaction gas, a gas diffusion layer composed of carbon particles at the substrate side of the reaction layer, and an electron collection layer composed of conductive material at the substrate side of the gas diffusion layer. In one substrate, the hydrogen gas which is uniformly diffused by passing through the gap between the carbon particles forming the gas diffusion layer reacts in the reaction layer and is divided into hydrogen ion and electron. The generated electrons are collected in an electron collection layer and the electrons flow in the electron collection layer of the other substrate. The hydrogen ions are moved toward the reaction layer of a second substrate through a polymer electrolyte film and react with the oxygen gas and the electrons flowing from the electron collection layer to generate the water.

In such a fuel cell, the electron collection layer to collect the electron generated by the reaction was formed by entirely applying a conductive paste containing conductive material along the gas flow path of the substrate. However, in this method, there is a problem that the usage amount of the expensive conductive material is increased and thus the manufacturing cost increases.

In addition, as the method to form the reaction layer, there are, for example, methods as follows: (a) a method of applying and drying paste to form an electrode catalyst layer fabricated by mixing catalyst immersion carbon with polymer electrolyte solution and organic solvent to transferring base material (sheet made of polytetrafluoroethylene), pressing it to an electrolyte film and then stripping the transferring base material therefrom (See Japan Unexamined Patent Application Publication No. 8-88008), (b) a method of applying an electrolyte solution of carbon particles carrying solid catalyst onto a carbon layer used as an electrode by using a spray and then volatilizing the solvent (See Japan Unexamined Patent Application Publication No. 2002-298860). However, in these methods, the number of steps is large, and it is difficult to uniformly apply the catalyst and to accurately apply a predetermined amount of catalyst in a predetermined location, thereby decreasing the characteristics of the fuel cell (output density) or increasing the manufacturing cost due to increment of the usage amount of expensive catalyst, such as platinum.

SUMMARY OF THE INVENTION

The present invention is made in order to address the problems in the related art, and is to provide a fuel cell which, has a reaction layer having good reaction efficiency and an electron collection layer to efficiently collect the electrons generated in the reaction layer and of which the output density is high and the characteristics are good and a method of efficiently manufacturing the fuel cell and an electronic apparatus and a vehicle having the fuel cell as a power supplying source.

In order to address the above-mentioned problems and complete the present invention the inventor have found that the electron collection layer, composed by stacking the conductive material particles, can be efficiently obtained by applying the material to form the electron collection layer containing the conductive material at predetermined intervals by using an inkjet discharging device (hereinafter, "a discharging device"). The reaction layer can be similarly formed.

According to a first aspect of the present invention, a fuel cell including a first substrate provided with a gas flow path to supply a first reaction gas; a first electron collection layer formed on the first substrate; a first reaction layer formed on the first electron collection layer; an electrolyte film formed on the first reaction layer; a second reaction layer formed on the electrolyte film; a second electron collection layer formed on the second reaction layer; and a second substrate provided with a second gas flow path to supply a second reaction gas, at least one of the first electron collection layer and the second electron collection layer constructed by stacking conductive material particles is provided.

In the fuel cell according to an aspect of the present invention, at least one of the first reaction layer and the second reaction layer may be constructed by stacking metal particles.

According to a second aspect of the present invention, a method of manufacturing a fuel cell, including forming a first gas flow path to supply a first reaction gas in a first substrate; forming a first electron collection layer to collect electrons generated by reacting the first reaction gas supplied through the first gas flow path; forming a first reaction layer to react the first reaction gas supplied through the first gas flow path with a catalyst; forming an electrolyte film; forming a second gas flow path to supply a second reaction gas in a second substrate; forming a second electron collection layer supplying electrons with which a second reaction gas supplied through the second gas flow path reacts; and forming a second reaction layer to react a second reaction gas supplied through the second gas flow path with a catalyst, at least one of the first electron collection layer forming and the second electron collection layer forming including applying material to form the electron collection layer onto the first substrate or the second substrate at predetermined intervals.

In the method of manufacturing the fuel cell according to the present aspect of the invention, the material to form the electron collection layer may be applied using a discharging device.

In the method of manufacturing the fuel cell according to an aspect of the present invention, at least one of the first reaction layer forming and the second reaction layer forming may include applying material to form the reaction layer onto the first substrate or the second substrate at predetermined intervals. In this case, the material to form the reaction layer may be applied using a discharging device.

According to a third aspect of the present invention, an electronic apparatus including the fuel cell according to an aspect of the present invention as a power supply source is provided.

According to a fourth aspect of the present invention, a vehicle including the fuel cell according to an aspect of the present invention as a power supply source is provided.

In the fuel cell according to an aspect of the present invention, at least one of the first electron collection layer and the second electron collection layer is constructed by stacking the conductive material particles. Accordingly, the usage amount of the material to form the electron collection layer is less compared with the case that the electron collection layer is formed by entirely applying the material to form the electron collection layer containing the conductive material particles. Thus, the cost of manufacturing the fuel cell can be reduced. Also, since gaps exist between the conductive material particles, ventilation of the reaction gas is excellent, ensuring excellent conductivity.

Also, in the fuel cell according to an aspect of the present invention, at least one of the first reaction layer and the second reaction layer is constructed by stacking the metal particles. Accordingly, the usage amount of the material to form the reaction layer is less compared with the case that the reaction layer is formed by entirely applying the material to form the reaction layer containing the metal particles. Thus, the cost of manufacturing the fuel cell can be reduced. Also, since gaps exist between the metal particles, the contact area between the reaction gas and the metal particles of the catalyst is large and the reaction efficiency of the reaction gas can be increased. Accordingly, a fuel cell of which the output density is high and the characteristics are superior is obtained.

In the method of manufacturing the fuel cell according to an aspect of the present invention, since the material to form the electron collection layer is applied at predetermined intervals, the usage amount of the material to form the electron collection layer can be reduced. Accordingly, the fuel cell can be cheaply manufactured.

In the method of manufacturing the fuel cell according to an aspect of the present invention, in case of applying the material to form the electron collection layer by using a discharging device, a certain amount of the material can be accurately applied at a predetermined location by a simple manipulation. Accordingly, the usage amount of the material to form the electron collection layer can be minimized. Thus the electron collection layer having a desired pattern (shape) can be efficiently formed. Also, the ventilation of the reaction gas can be easily controlled by varying the applied interval of the material to form the electron collection layer depending on the location and the kind of the material to form the electron collection layer can be freely varied depending on the applied location.

In the method of manufacturing the fuel cell according to an aspect of the present invention, since the material to form the reaction layer is applied at predetermined intervals, the usage amount of the material to form the reaction layer can be reduced.

Accordingly, the fuel cell can be cheaply manufactured.

In the method of manufacturing the fuel cell according to an aspect of the present invention, in case of applying the material to form the reaction layer by using a discharging device, a certain amount of the material can be accurately applied at a predetermined location by a simple manipulation. Accordingly, the usage amount of the material to form the reaction layer can be largely saved, and thus the reaction layer having a desired pattern (shape) can be efficiently formed. Also, the ventilation of the reaction gas can be easily controlled by varying the applied interval of the material to form the reaction layer depending on the location. The kind of material used to form the reaction layer can be freely varied depending on the applied location.

The electronic apparatus according to an aspect of the present invention includes the fuel cell manufactured by the manufacturing method according to an aspect of the present invention as a power supply source. According to the electronic apparatus of an aspect of the present invention, clean energy considering the earth's environment can be included as the power supply source.

Also, a vehicle according to an aspect of the present invention includes the fuel cell manufactured by the manufacturing method according to an aspect of the present invention as a power supply source. According to the vehicle of an aspect of the present invention, clean energy considering the earth's environment can be included as the power supply source.

BRIEF DESCRIPTION OF THE DRAWINGS

FIG. 1 is a cross-sectional schematic of a fuel cell according to an exemplary embodiment of the present invention;

FIG. 2 is a schematic of the structure of an electron collection layer according to an exemplary embodiment of the present invention;

DETAILED DESCRIPTION OF EXEMPLARY EMBODIMENTS

Figure 3:
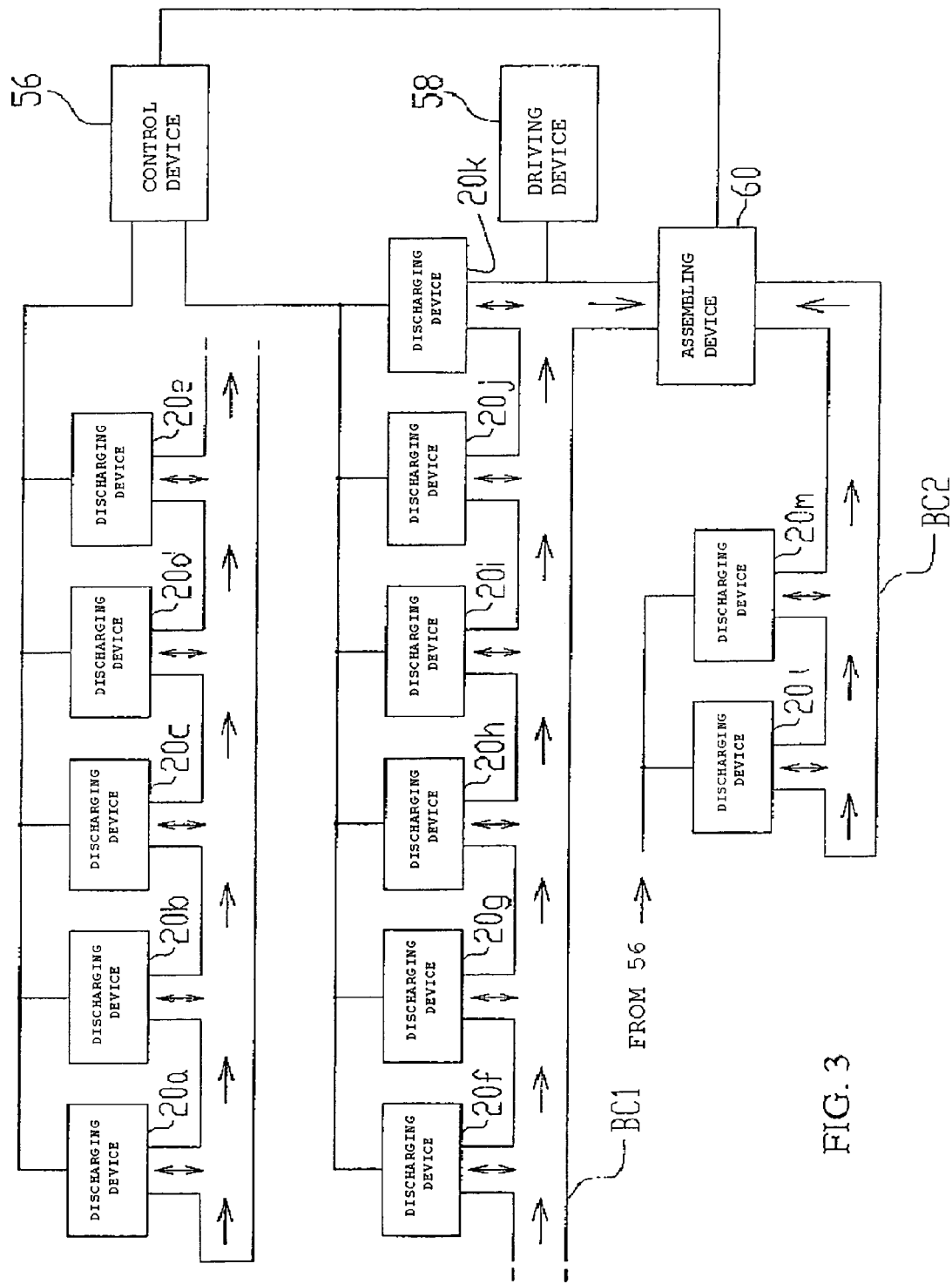
FIG. 3 is a schematic of a fuel cell manufacturing line according to an aspect of the embodiment of the present invention.

Hereinafter, the fuel cell, the method of manufacturing the same, the electronic apparatus and the vehicle of an aspect of the present invention will be further illustrated.

1) Fuel Cell

FIG. 1 shows a cross-sectional schematic of a fuel cell according to an aspect of the present invention. The fuel cell shown in FIG. 1 includes a first substrate 2, a first gas flow path 3 formed in the first substrate 2, a first supporting member 4 accommodated in the first gas flow path 3, a first electron collection layer 6 formed on the first substrate 2 and the first supporting member 4, a first gas diffusion layer 8, a first reaction layer 10 formed on the first gas diffusion layer 8, an electrolyte film 12, a second reaction layer 10', a second gas diffusion layer 8', a second electron collection layer 6', a second gas flow path 3', a second supporting member 4' accommodated in the second gas flow path 3', and a second substrate 2', from the lower side in the drawing.

The fuel cell of an aspect of the present invention may include, for example, a fuel cell in which the electrolyte film 12 is a ceramic system solid electrolyte or a fuel cell which is made of polymer electrolyte material, but is not particularly limited to these.

The fuel cell of an aspect of the present invention operates as follow. A first reaction gas is introduced from the first gas flow path 3 of the first substrate 2 and is uniformly diffused by the gas diffusion layer 8 so that the diffused first reaction gas reacts in the first reaction layer 10 to generate ions and electrons. Thus the generated electrons are collected in the electron collection layer 6 to flow into the second electron collection layer 6' of the second substrate 2'. The ions generated by the first reaction gas are moved in the electrolyte film 12 toward the second reaction layer 10'. The second reaction gas is introduced from the second gas flow path 3' of the second substrate 2' and is uniformly diffused by the second gas diffusion layer 8' so that the diffused first reaction gas reacts with the ions moved in the electrolyte film 12 and the electrons moved from the second electron collection layer 6', in the reaction layer 10'. For example, in a case that the first reaction gas is hydrogen gas and the second reaction gas is oxygen gas, in the first reaction layer 10, the reaction of $H_2 \rightarrow 2H^+ + 2e^-$ is advanced, and, in the second reaction layer 10', the reaction of $\frac{1}{2}O_2 + 2H^+ + 2e^- \rightarrow H_2O$ is advanced.

In the fuel cell of an aspect of the present invention at least one of the first electron collection layer 6 and the second electron collection layer 6' is constructed by staking the conductive material particles. FIG. 2 is a schematic of the electron collection layer 6 (or 6') having such a structure. FIG. 2(a) is a partial cross-sectional schematic of the electron collection layer 6 (or 6'). FIG. 2(b) is the structure in FIG. 2(a) viewed at the side thereof.

In FIG. 2, the conductive material particles 60 are positioned in a horizontal direction at predetermined intervals and the conductive material particles are stacked thereon. Accordingly, since the usage amount of the conductive material 60 is less, compared with the case that the electron collection layer is formed by entirely applying the material to form the electron collection layer containing the conductive material, the cost of manufacturing the fuel cell can be reduced. Also, since the electron collection layer 6 (or 6') shown in FIG. 2 has a structure in which the conductive material particles 60 are in contact with each other and gaps exist, the ventilation of the first (or the second) reaction gas is excellent, ensuring excellent conductivity.

As the conductive material used in the electron collection layer, it is not limited if it has conductivity. For example, there are platinum, cupper, gold, silver, aluminum, tungsten, and the combination thereof. They can be used alone or in combination. Also, the conductive material particles forming the electron collection layer may have at least a particle shape, and may have an elliptical shape and a cylindrical shape. The particle size of the conductive material is not particularly limited and can be freely set.

In addition, in the fuel cell of an aspect of the present invention, the first reaction layer 10 and the second reaction layer 10' may have also the same structure as the first electron collection layer and/or the second electron collection layer. Specifically, a structure in which the metal particles are stacked. This reaction layer 10 (10') has the same structure as the above-mentioned electron collection layer 6 (6'). In case that at least one of the first reaction layer and the second reaction layer has such a structure, the usage amount of the material to form the reaction layer is less compared with the case that the reaction layer is formed by entirely applying the material to form the reaction layer containing the metal particles. The cost of manufacturing the fuel cell also can be reduced. Also, since gaps exist between the metal particles, the contact area between the reaction gas and the metal particles of the catalyst is large and the reaction efficiency of the reaction gas can be increased. Accordingly, the excellent fuel cell of which the output density is high and the characteristics are superior is obtained.

The metal particle used is not particularly limited if it functions as the reaction catalyst of the first reaction gas and the second reaction gas. For example, there are platinum, rhodium, ruthenium, iridium, palladium, osmium, and one kind or at least two kinds of metal particle selected from the group consisting of the alloy of at least two kinds of the particles. Among them, platinum is preferable. The size of the metal particle is generally 1 nm to 100 nm, and preferably several nm to several tens nm.

2) A Method of Manufacturing the Fuel Cell

The method of manufacturing the fuel cell according to an aspect of the present invention includes forming a first gas flow path in a first substrate; forming a first electron collection layer; forming a first reaction layer; forming an electrolyte film; forming a second gas flow path; forming a second electron collection layer; and forming a second reaction layer. At least one of the first electron collection layer forming and the second electron collection layer forming including forming the electron collection layer by applying material to form the electron collection layer onto the first substrate or the second substrate at predetermined intervals.

The method of manufacturing the fuel cell according to an aspect of the present invention can be performed using a fuel cell manufacturing apparatus shown in FIG. 3 (fuel cell manufacturing line). The fuel cell manufacturing line shown in FIG. 3 includes discharging devices 20a to 20k, a belt conveyor BC1 connecting the discharging devices 20a to 20k, a belt conveyor BC2 connecting discharging devices 20l, 20m, a driving device 58 to drive the belt conveyors BC1, BC2, a assembling device 60 to assemble the fuel cell, and a control device 56 to control the whole fuel cell manufacturing line.

The discharging devices 20a to 20k are positioned at predetermined intervals in a line along the belt conveyor BC1. The discharging devices 20l, 20m are positioned at predetermined intervals in a line along the belt conveyor BC2. Also, the control device 56 is connected with the discharging devices 20a to 20k, the discharging devices 20l, 20m, the driving device 58 and the assembling device 60.

In the fuel cell manufacturing line, the belt conveyor BC1 driven by the driving device 58 is driven and the substrate of the fuel cell (hereinafter, "substrate") is carried into each of the discharging devices 20a to 20k. Thus the step in each of the discharging device 20a to 20k is performed. Similarly, the belt conveyor BC2 is driven based on the control signal from the control device 56, the substrate is carried into the discharging device 20l, 20m, and thus the step in each of the discharging devices 20l, 20m is performed. Also, in the assembling device 60, the assembling task of the fuel cell is performed using the substrate carried by the belt conveyor BC1 and BC2, based on the control signal from the control device 56.

Each of the discharging devices 20a to 20m is not particularly limited if it is an inkjet-type discharging device. For example, there are a thermal-type discharging device to generate bubbles by heat and discharge liquid drops and a piezo-type discharging device to discharge liquid drops by compression using a piezo element.

Figure 4:
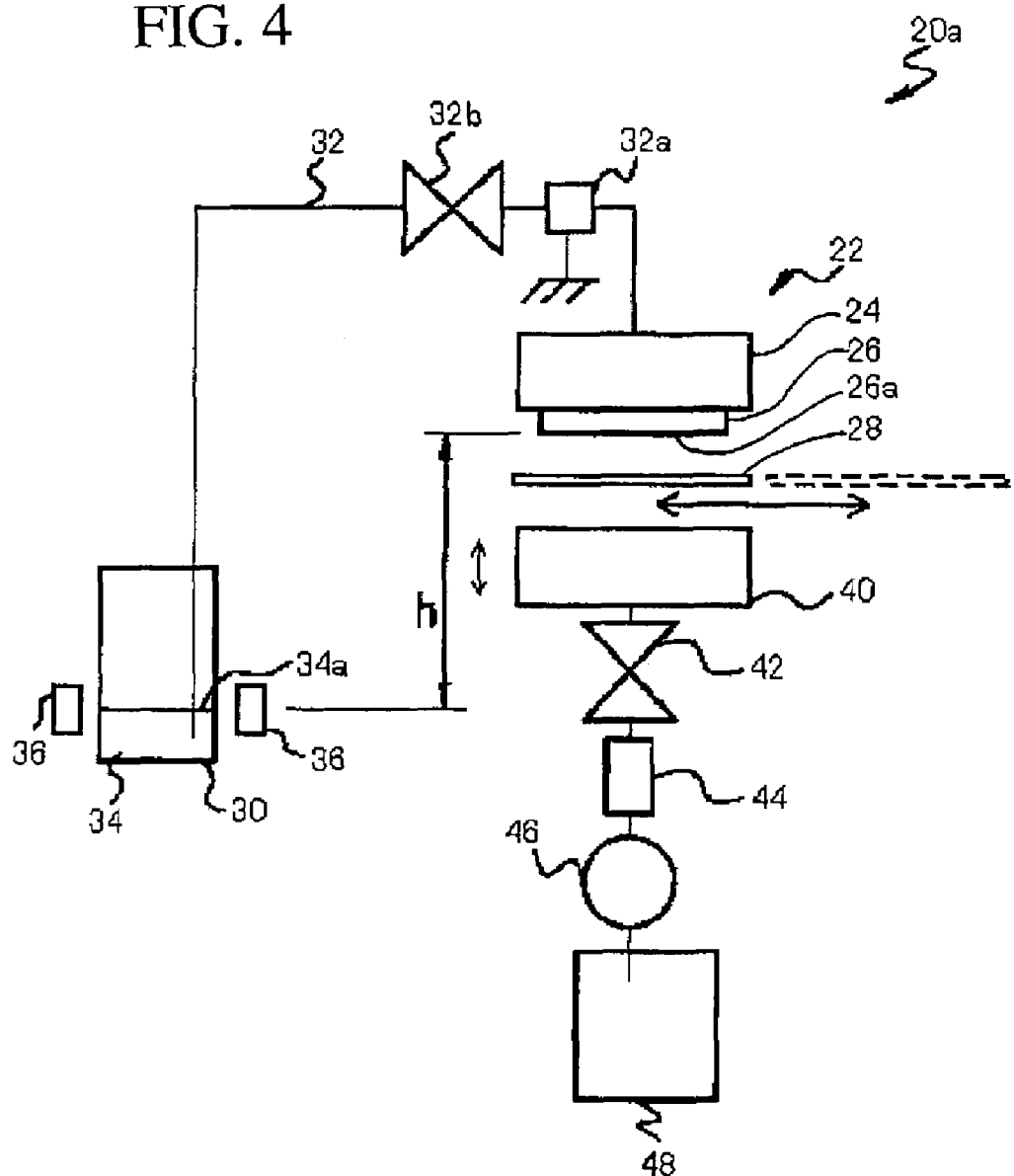
FIG. 4 is a schematic of an inkjet discharging device according to an exemplary embodiment of the present invention.

FIG. 4 is a schematic of the discharging device 20a used in the fuel cell manufacturing line shown in FIG. 3. The discharging device 20a includes a tank 30 accommodating discharge 34, an inkjet head 22 connected to the tank 30 through a discharge carrying pipe 32, a table 28 to mount and carry the discharge, an absorbing cap 40 to absorb surplus discharge 34 stayed in the inkjet head 22 and remove the surplus discharge 34 from the inkjet head 22, and a wastewater tank 48 to accommodate the surplus discharge absorbed by the absorbing cap 40.

The tank 30 accommodates the discharge 34, such as resist solution, and has a liquid surface control sensor 36 to control the height of the liquid surface 34a of the discharge accommodated in the tank 30. The liquid surface control sensor 36 performs the control to maintain the difference h (hereinafter, "water head value") between the top end 26a of a nozzle forming surface 26 provided in the inkjet head 22 and the height of the liquid surface 34a in the tank 30 within a predetermined range. For example, the height of the liquid surface 34a is controlled so that this water head value becomes 25 m±0.5 mm and the discharge 34 in the tank 30 can be sent to the inkjet head 22 by the press in a predetermined range. The needed amount of the discharge 34 can be stably discharged from the inkjet head 22 by sending the discharge 34 by the press in the predetermined range.

The discharge carrying pipe 32 has a discharge flowing path ground connection portion 32a to prevent electrification in the flowing path of the discharge carrying pipe 32 and a head portion bubble discharge valve 32b. The head portion bubble discharge valve 32b is used in case of absorbing the discharge in the inkjet head 22 by the below-mentioned absorbing cap 40.

The inkjet head 22 includes a head body 24 and a nozzle forming surface 26 having a plurality of nozzles to discharge the discharge, for example, the resist solution applied to the substrate when forming the gas flow path to provide the reaction gas on the substrate.

The table 28 is positioned so as to be moved in a predetermined direction. The table 28 mounts the substrate carried by the belt conveyor BC1, is moved in the direction of the arrow in the drawings and is accommodated in the discharging device 20a.

The absorbing cap 40 can be moved in the direction of the arrow shown in FIG. 4, and is closely adhered to the nozzle forming surface 26 so that the plurality of nozzles formed on the nozzle forming surface 26 are surrounded and the sealing space is formed between the nozzle forming surface 26 and the absorbing cap 40 to isolate the nozzle from exterior air.

For example, when absorbing the discharge in the inkjet head 22 by the absorbing cap 40, the absorption is performed in a state that the head portion bubble discharge valve 32b is closed and the discharge is not introduced from the tank 30. Thereby the flow rate of the absorbed discharge is increased and thus the bubble in the inkjet head 22 can be rapidly discharged.

A flowing path is provided in the lower portion of the absorbing cap 40 and an absorbing valve 42 is provided in the flowing path. The absorbing valve 42 performs a function of closing the flowing path in order to reduce the time to balance the pressure (atmospheric pressure) between the lower absorbing side of the absorbing valve 42 and the upper side of the inkjet head 22. The flowing path is provided with an absorbing pressure detecting sensor 44 to detect absorption failure and an absorption pump 46 composed of a tube pump. Also, the discharge 34 absorbed and carried into the absorbing pump 46 is temporarily accommodated in the wastewater tank 48.

In the present exemplary embodiment, each of the discharging devices 20b to 20m is the same structure as the discharging device 20a, excluding that the kind of the discharge 34 is different. Accordingly, hereinafter, like components in each discharge device use like numerals.

Next, manufacturing the fuel cell will be explained using the fuel cell manufacturing line shown in FIG. 3.

Figure 5:
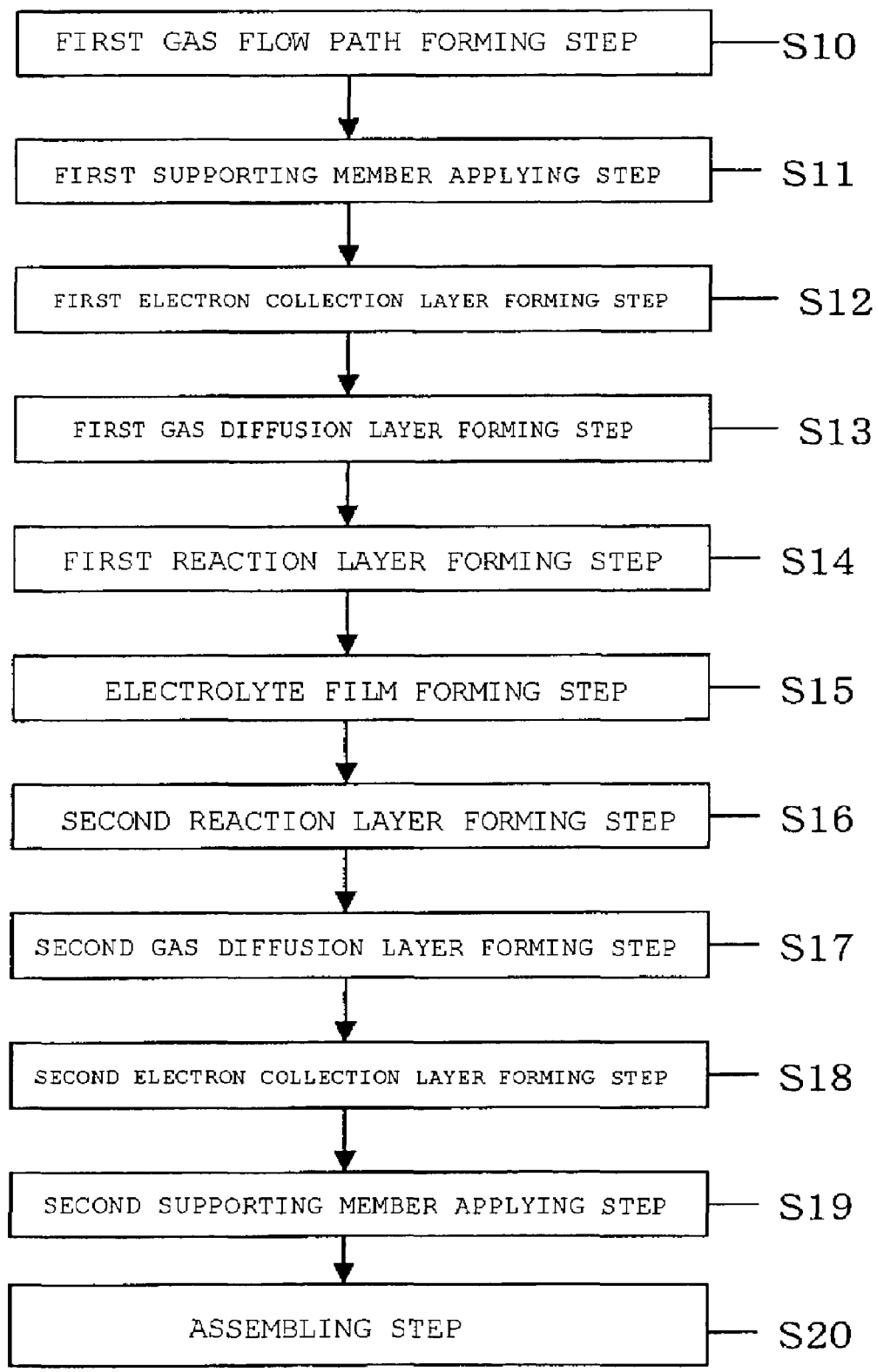
FIG. 5 is a flowchart of a method of manufacturing a fuel cell according to an exemplary embodiment of the present invention.

FIG. 5 shows a flowchart of a method of manufacturing the fuel cell using the fuel cell manufacturing line shown in FIG. 3.

As shown in FIG. 5, the fuel cell according to the present exemplary embodiment is manufactured by forming a gas flow path in a first substrate (S10, a first gas flow path forming step), applying a first supporting member in the gas flow path (S11, a first supporting member applying step), forming a first electron collection layer (S12, a first electron collection layer forming step), forming a first gas diffusion layer (S13, a first gas diffusion layer forming step), forming a first reaction layer (S14, a first reaction layer forming step), forming an electrolyte film (S15, an electrolyte film forming step), forming a second reaction layer (S16, a second reaction layer forming step), forming a second gas diffusion layer (S17, a second gas diffusion layer forming step), forming a second electron collection layer (S18, a second electron collection layer forming step), applying a second supporting member in the second gas flow path (S19, a second supporting member applying step) and laminating a second substrate provided with the second gas flow path (S20, a assembling step).

(1) First Gas Flowing Forming Step (S110)

Figure 6A:
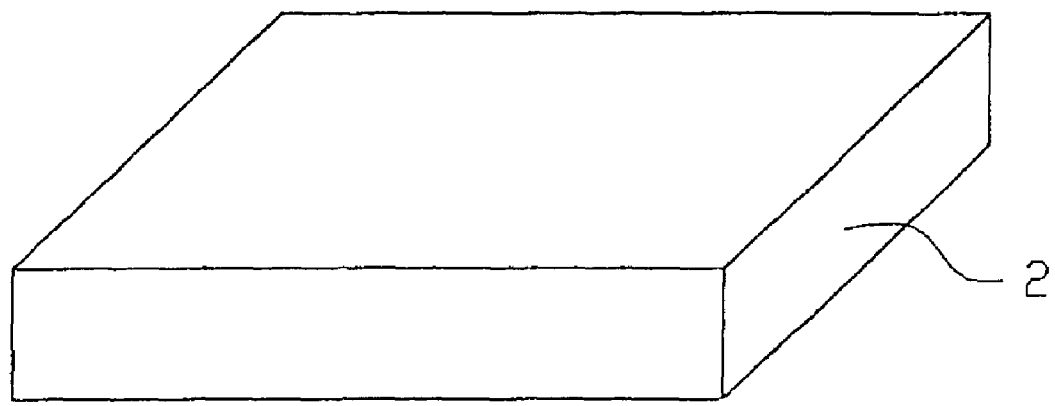
FIG. 6 illustrates forming the gas flow path according to an exemplary embodiment of the present invention.

First, as shown in FIG. 6(a), a first substrate 2 having a rectangular shape is prepared and is carried into the discharging device 20a by the belt conveyor BC1. The substrate 2 is not particularly limited and may use the substrate used in the general fuel cell, such as a silicon substrate. In the present exemplary embodiment, the silicon substrate is used.

Figure 6B:
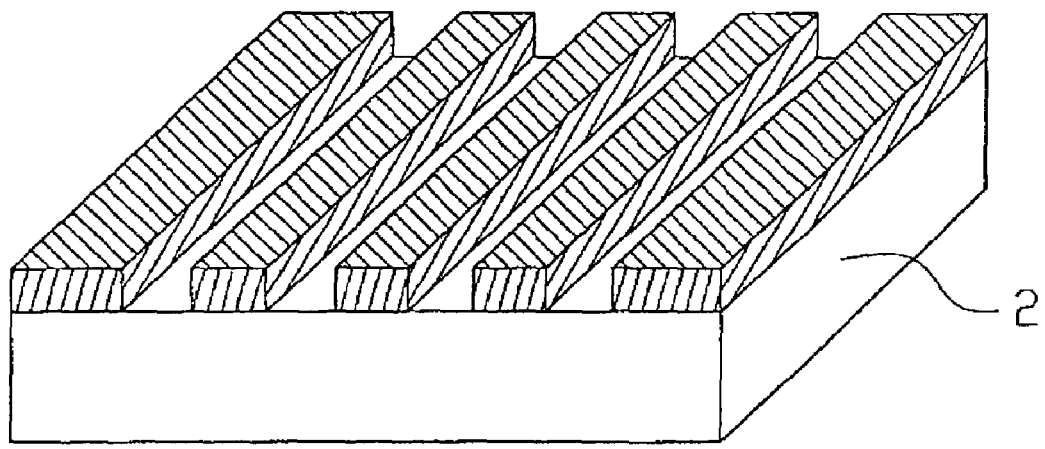

The substrate 2 carried by the belt conveyor BC1 is mounted on the table 28 of the discharging device 20a and is accommodated in the discharging device 20a. Within the discharging device 20a, the resist liquid accommodated in the tank 30 of the discharging device 20a is applied at a predetermined location on the substrate 2 mounted on the table 28 through the nozzle of the nozzle forming surface 26, and thus resist pattern (the oblique line portion in the drawing) is formed on the surface of the substrate 2. As shown in FIG. 6(b), the resist pattern is formed in the portion, except for the portion in which the first gas flow path to supply the first reaction gas to the surface of the substrate 2 is formed.

Figure 7A:
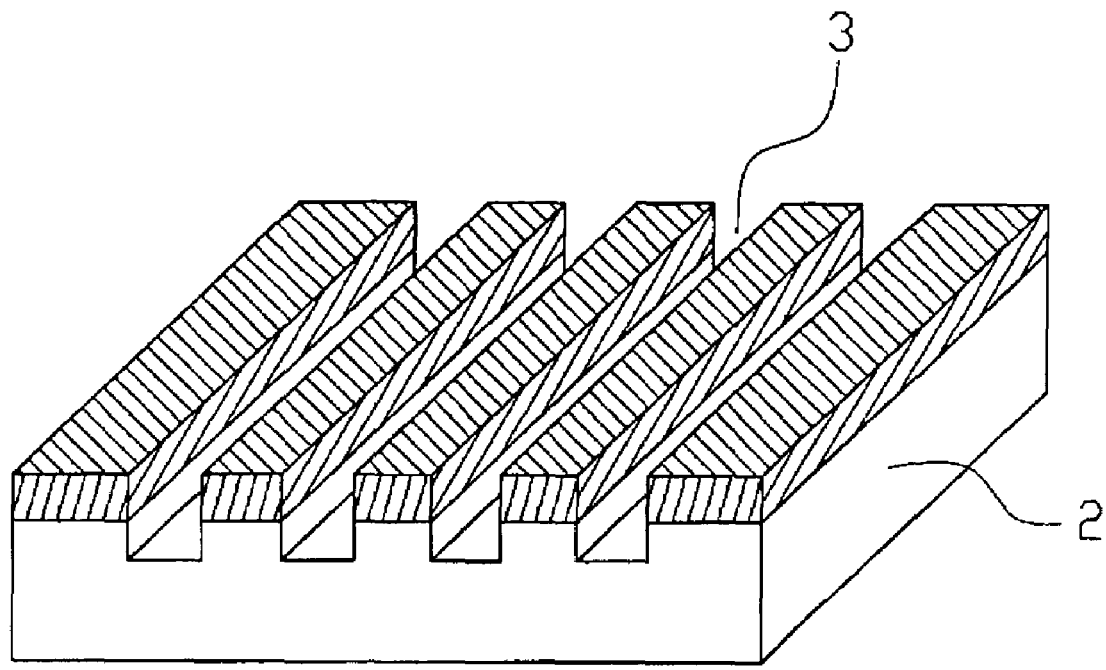
FIG. 7 illustrates forming the gas flow path according to an exemplary embodiment of the present invention.
Figure 7B:
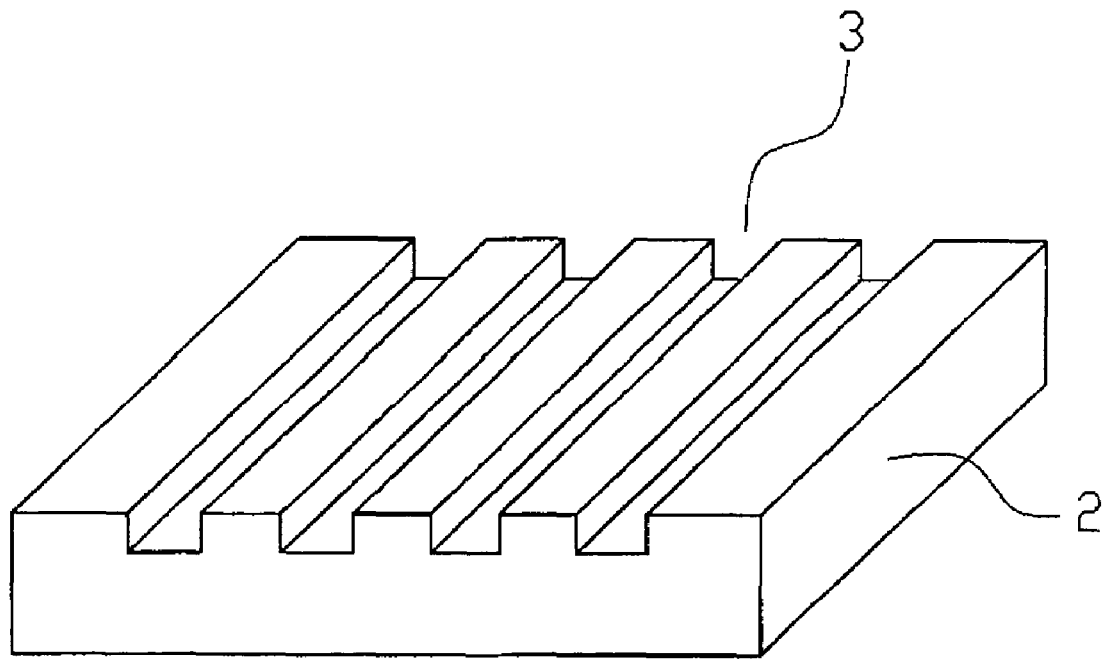

The substrate 2, in which the resist pattern is formed in the predetermined location, is carried into the discharging device 20b by the belt conveyor BC1 and is mounted on the table 28 of the discharging device 20b to be accommodated in the discharging device 20b. Within the discharging device 20b, the etching solution, such as an aqueous solution of hydrofluoric acid accommodated in the tank 30, is applied on the surface of the substrate 2 by the nozzle of the nozzle forming surface 26. The surface of the substrate 2, except for the portion in which the resist pattern is formed, is etched by the etchant and the U-shaped first gas flow path extending from one side of the substrate 2 to the other side thereof is formed, as shown in FIG. 7(a). Also, as shown in FIG. 7(b), the surface of the substrate provided with the gas flow path is cleaned by a cleaner (not shown), thereby removing the resist pattern. Next, the substrate 2 provided with the gas flow path is moved from the table 28 to the belt conveyor BC1 and is carried into the discharging device 20c by the belt conveyor BC1.

(2) First Supporting Member Applying Step (S11)

Next, on the substrate 2 provided with the first gas flow path, the first supporting member to support the first electron collection layer is applied in the gas flow path. The application of the first supporting member is performed by mounting the substrate 2 on the table 28 to be accommodated in the discharging device 20c and then discharging the first supporting member 4 accommodated in the tank 30 into the first gas flow path formed in the substrate 2 through the nozzle of the nozzle forming surface 26 by the discharging device 20c.

Figure 8:
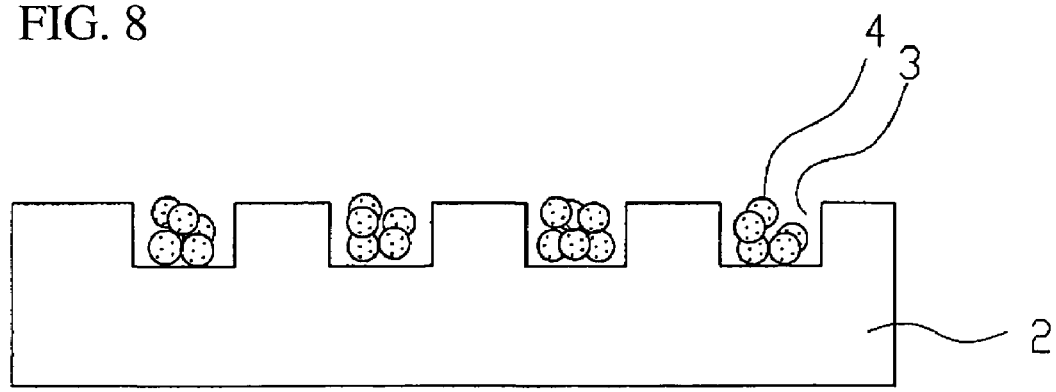
FIG. 8 is a cross-sectional schematic of the substrate in manufacturing of the fuel cell according to an exemplary embodiment of the present invention.

The first supporting member used is not particularly limited if it is inert with respect to the first reaction gas. This reduces the likelihood or prevents the first electron collection layer from being dropped to the first gas flow path and reduces the likelihood or prevents the first reaction gas from being diffused into the first reaction layer. For example, there are carbon particle and glass particle. In the present exemplary embodiment, porous carbon having a particle diameter of about 1 to 5 micron has been used. By using the porous carbon having a predetermined particle diameter as the supporting member, the reaction gas supplied through the gas flow path is diffused through the gap of the porous carbon from the upper side, and thus the flow of the reaction gas is not prevented. FIG. 8 shows a cross-sectional schematic of the substrate 2 applied with the first supporting member 4. The substrate 2 applied with the first supporting member is moved from the table 28 to the belt conveyor BC1 and is carried into the discharging device 20d by the belt conveyor BC1.

(3) First Electron Collection Forming Step (S12)

Next, on the substrate 2, the first electron collection to collect the electron generated by allowing the first reaction gas to react is formed. First, the substrate 2 carried into the discharging device 20d by the belt conveyor BC1 is mounted on the table 28 and is accommodated into the discharging device 20d. In the discharging device 20d, the first electron collection layer is formed by discharging a certain amount of material accommodated in the tank 30 to form the electron collection layer to the substrate 2 at predetermined intervals through the nozzle of the nozzle forming surface 26.

Concretely, the formation of the first electron collection layer is preformed by applying a certain amount of conductive material onto the first substrate at predetermined intervals. The application is performed in plural. For example, the first layer applied at predetermined intervals in a distributed point shape (punching metal shape) on the surface of the substrate and the second layer applied in a location different from the applied location of the first layer are repeated. The electron collection layer can be formed by stacking the conductive material particles. By forming the electron collection layer as mentioned above, the electron collection layer having excellent ventilation of the reaction gas and ensuring the conductivity can be efficiently formed.

The one-time applied amount of the material to form the electron collection layer is not particularly limited. Also, the applied interval of the material to form the electron layer is not particularly limited. Since the particle size of the conductive material is determined by the one-time applied amount, the ventilation of the electron collection layer can be controlled by adequately determining the one-time applied amount and the applied interval of the conductive material. Particularly, since the conductive material is applied by using the discharging device, a predetermined amount of the conductive material can be accurately applied at a predetermined location by a simple manipulation. Accordingly, the usage amount of the material to form the electron collection layer can be largely saved. Thus the electron collection layer having a desired pattern (shape) can be efficiently formed. Also, the ventilation of the reaction gas can be easily controlled by varying the applied interval of the material to form the electron collection layer depending on the location and the kind of the material to form the electron collection layer can be freely varied depending on the applied location.

Figure 9:
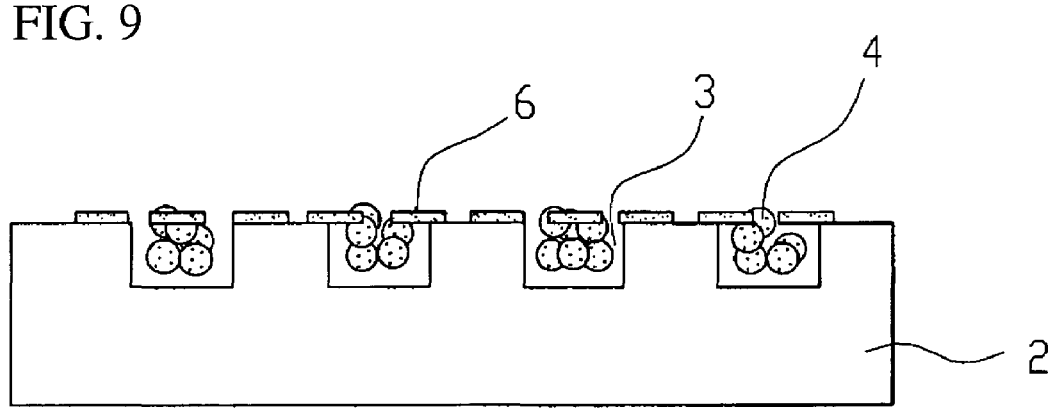
FIG. 9 is a cross-sectional schematic of the substrate in manufacturing of the fuel cell according to an exemplary embodiment of the present invention.

FIG. 9 shows a cross-sectional schematic of the substrate 2 provided with the first electron collection layer 6. As shown in FIG. 2, the first electron collection layer 6 is constructed by stacking the conductive material particles 60. Also, as shown in FIG. 9, the first electron collection layer 6 is supported by the first supporting member 4 in the first gas flow path formed in the substrate 2 to reduce the likelihood or prevent from being dropped in the first gas flow path. The substrate 2 provided with the first electron collection layer 6 is moved from the table 28 to the belt conveyor BC1 and is carried into the discharging device 20e by the belt conveyor BC1.

(4) First Gas Diffusion Layer Forming Step (S13)

Next, the first gas diffusion layer is formed on the electron collection layer of the substrate 2. First, the substrate 2 carried into the discharging device 20e by the belt conveyor BC1 is mounted on the table 28 and is accommodated in the discharging device 20e. Within the discharging device 20e, the material to form the gas diffusion layer accommodated in the tank 30 of the discharging device 20e is discharged to a predetermined location of the surface of the substrate 2 mounted on the table 28 through the nozzle of the nozzle forming surface 26 and thus the first gas diffusion layer 8 is formed.

As the material to form the gas diffusion layer, carbon particle is generally used, and carbon nano-tube, carbon nano horn, fullerene may be used. In the present exemplary embodiment, since the gas diffusion layer is formed using the applying device 20e, the carbon particle having large particle diameter (several tens μm) is used in the electron collection layer side, the carbon particle having small particle diameter (several ten nm) is used in the surface side. Thereby, in the vicinity of the substrate, the width of the flowing path is large and the diffusion resistance of the reaction gas is as small as possible. In the vicinity of the reaction layer (the surface of the gas diffusion layer side), the gas diffusion layer composed of the uniform narrow flowing path can be easily formed. Also, the carbon particle may be used in the substrate side of the gas diffusion layer, and the material which the gas diffusion capability is low but catalyst carrying capability is excellent may be used in the surface side.

Figure 10:
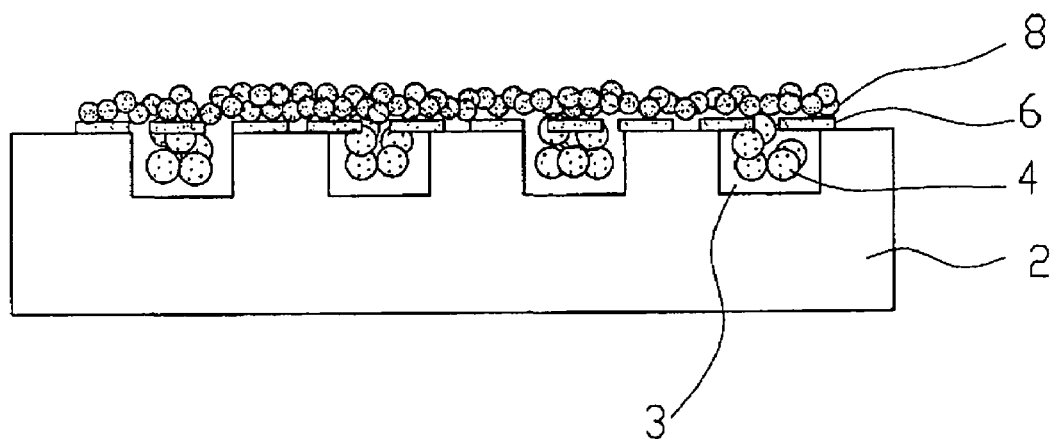
FIG. 10 is a cross-sectional schematic of the substrate in manufacturing of the fuel cell according to an exemplary embodiment of the present invention.

FIG. 10 shows a cross-sectional schematic of the substrate 2 provided with the first gas diffusion layer 8. As shown in FIG. 10, the first gas diffusion layer 8 is formed over all the substrate 2 so as to cover the first electron collection layer formed on the substrate 2. The substrate 2 provided with the first gas diffusion layer 8 is moved form the table 28 to the belt conveyor BC1 and is carried into the discharging device 20*f* by the belt conveyor BC1.

(5) First Reaction Layer Forming Step (S14)

Next, the first reaction layer is formed on the substrate 2. The first reaction layer is formed so as to be electrically connected to the first electron collection layer 6 through the gas diffusion layer 8. First, the substrate 2 which is carried into the discharging device 20*f* by the belt conveyor BC1 is mounted on the table 28 and is accommodated in the discharging device 20*f*. Within the discharging device 20*f*, the dispersion containing organic dispersant and metal particles accommodated in the tank 30 of the discharging device 20*f* is discharged at a predetermined location of the surface of the substrate 2 mounted on the table 28 through the nozzle of the nozzle forming surface 26 and thus the applied film of the dispersion is formed. Next, the heating treatment is performed to evaporate or combust the organic dispersant and thus the reaction layer composed of metal particles is formed. Also, the reaction layer can be formed by discharging the dispersion containing the metal particles and organic dispersant to a predetermined location of the surface of the substrate 2 mounted on the table 28 through the nozzle of the nozzle forming surface 26 to form the applied film of the dispersion and then baking the applied film at a temperature of 200 to 300° C. under the atmosphere of inert gas, such as nitrogen gas. In this case, the reaction layer attached with the carbon particle generated by firing the organic dispersant in the metal particle can be obtained.

In the method of manufacturing the fuel cell of the present invention, it is preferable that the reaction layer is formed by applying a certain amount of the material to form the reaction layer at predetermined intervals by using the discharging device 20*f*. According to this method, since a certain amount of the reaction layer can be accurately applied at the predetermined location by a simple manipulation, the amount of the material to form the reaction layer can be largely saved, and thus the reaction layer having a desired pattern (shape) can be efficiently formed. Also, the applied interval of the material to form the reaction layer is varied depending on the location and the kind of the material to form the reaction layer can be varied depending on the applied location.

The metal particle used in the dispersion is not particularly limited if it functions as the reaction catalyst of the first reaction gas and the second reaction gas. For example, there are platinum, rhodium, ruthenium, iridium, palladium, osmium, and one kind or at least two kinds of metal particle selected from the group consisting of an alloy of at least two kinds of the particles. Among them, platinum is preferable. The size of the metal particle is generally 1 nm to 100 nm, and preferably several nm to several tens nm, but is not limited to this.

The organic dispersant is used in order to reduce or prevent cohesion and precipitation of the metal particles and uniformly disperse the metal particles in the dispersion. The organic dispersant is not particularly limited if the metal particle can be uniformly dispersed in the dispersion and particle-shaped carbon is made by baking it at a predetermined temperature under non-oxygen atmosphere. For example, there are organic dispersants made of carbon, hydrogen, and oxygen or organic dispersant made of carbon and hydrogen, such as alcohols, ketones, esters, ethers, hydrocarbons, aromatic hydrocarbons.

In addition, in the dispersion, in addition to the metal particle and the organic dispersant, an other solvent may be contained. As the other solvent, there are, for example, water, methanol and ethanol. The amount of the metal particle and the organic dispersant in the dispersion is not particularly limited and may be adequately set depending on the thickness of the applied film.

Figure 11:
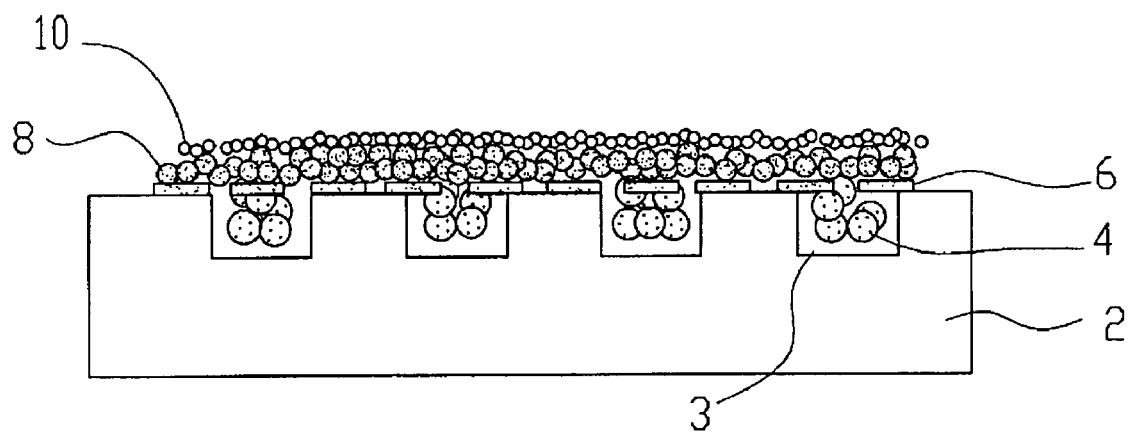
FIG. 11 is a cross-sectional schematic of the substrate in the manufacturing of the fuel cell according to an exemplary embodiment of the present invention.

FIG. 11 shows a cross-sectional schematic of the substrate 2 provided with the first reaction layer. In case of applying and forming the first reaction layer 10 at predetermined intervals using the discharging device 20*f*, in the structure of the first electron collection layer 6 shown in FIG. 2, the conductive material particle 60 having the same structure as the metal particle can be obtained. The substrate 2 provided with the first reaction layer is moved from the table 28 to the belt conveyor BC1 and is carried into the discharging device 20*g* by the belt conveyor BC1.

(6) Electrolyte Film Forming Step (S15)

Next, the electrolyte film is formed on the substrate 2 provided with the first reaction layer 10. First, the substrate 2 carried into the discharging device 20*g* by the belt conveyor BC1 is mounted on the table 28 and is accommodated in the discharging device 20*g*. In the discharging device 20*g*, the material to form the electrolyte film accommodated in the tank 30 is discharged on the first reaction layer 10 through the nozzle of the nozzle forming surface 26. Thus the electrolyte film 12 is formed.

As the material to form the electrolyte film, there are, for example, materials of which ceramic system solid electrolyte is adjusted in a predetermined viscosity (for example, 20 cP or less), such as tungstophosphoric acid, molybdophosphoric acid or polymer electrolyte material obtained by micelling perfluorosulfonic acid, such as Nafion (Du Pont) in mixed solution which the weight ratio of the water and the methanol is 1:1.

Figure 12:
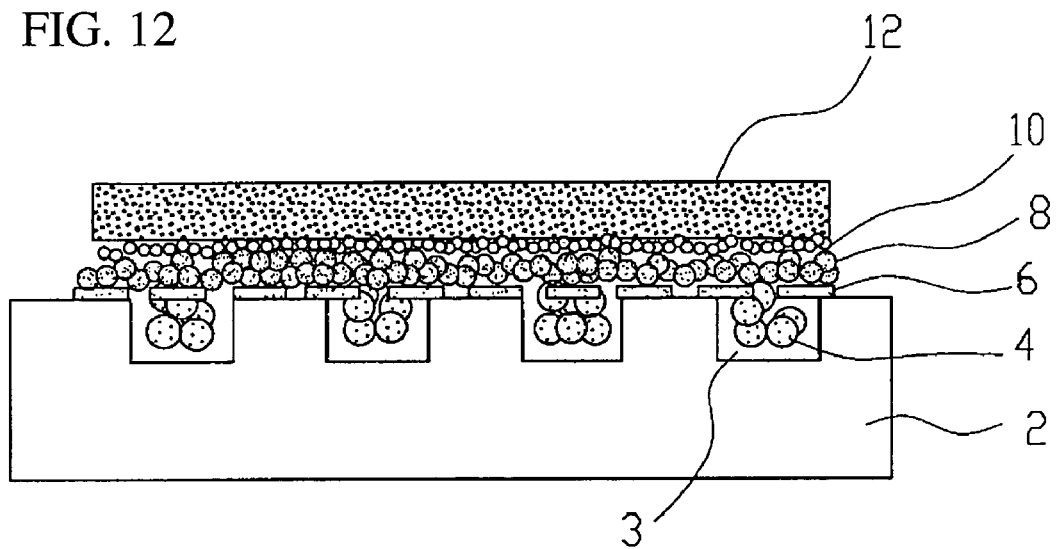
FIG. 12 is a schematic before or after the applied film of the dispersant is formed and the reaction layer is formed.

FIG. 12 shows a cross-sectional schematic of the substrate 2 provided with the electrolyte film. As shown in FIG. 12, the electrolyte film 12 having a predetermined thickness is formed on the first reaction layer 10. The substrate 2 provided with the electrolyte film is moved from the table 28 to the belt conveyor BC1 and is carried to the discharging device 20*h* by the belt conveyor BC1.

(7) Second Reaction Layer Forming Step (S16)

Next, the second reaction layer is formed on the substrate 2 provided with the electrolyte film 12. First, the substrate 2 carried to the discharging device 20*h* by the belt conveyor BC1 is mounted on the table 28 and is accommodated in the discharging device 20*h*. In the discharging device 20*h*, the second reaction layer 10' is formed by the same step as the step performed in the discharging device 20*f*. As the material to form the second reaction layer 10', the same material as the material to form the first reaction layer is used.

Figure 13:
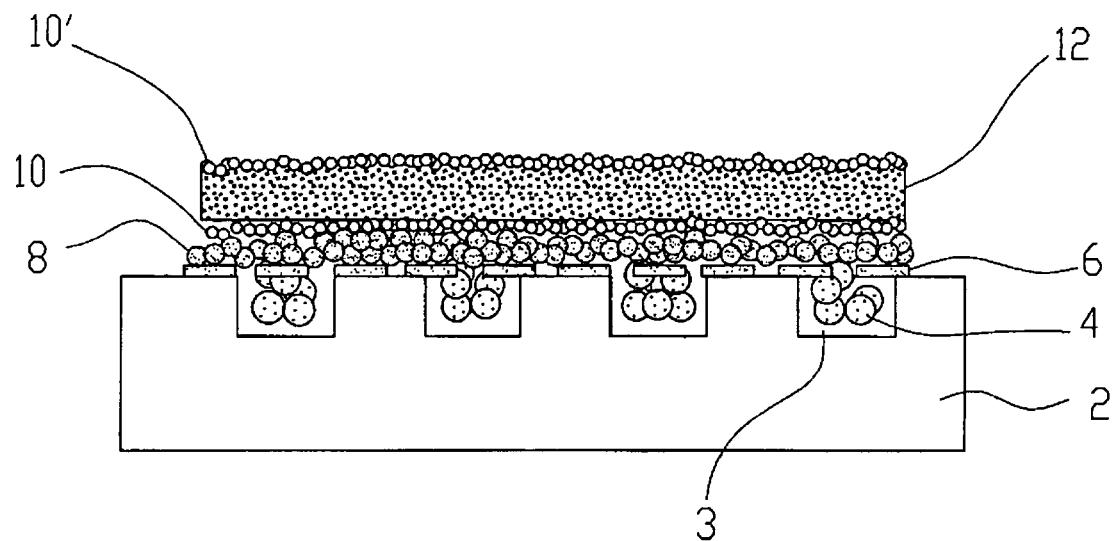
FIG. 13 is a cross-sectional schematic of the substrate in the manufacturing of the fuel cell according to an exemplary embodiment of the present invention.

FIG. 13 shows a cross-sectional schematic of the substrate 2 in which the second reaction layer 10' is formed on the electrolyte film 12. As shown in FIG. 13, the second reaction layer 10' is formed on the electrolyte film 12. In the reaction layer 10', the reaction of the second reaction gas is performed. The substrate 2 provided with the second reaction layer 10' is moved from the table 28 to the belt conveyor BC1 and is carried to the discharging device 20*i* by the belt conveyor BC1.

(8) Second Gas Diffusion Forming Step (S17)

Next, the second gas diffusion layer is formed on the substrate 2 provided with the second reaction layer 10'. First, the substrate 2 carried to the discharging device 20*i* by the belt conveyor BC1 is mounted on the table 28 and is accommodated in the discharging device 20*i*. In the discharging device 20*i*, the second gas diffusion layer is formed by the same step as the step performed in the discharging device 20*e*. As the material to form the second gas diffusion layer, the same material as the material to form the first gas diffusion layer can be used.

Figure 14:
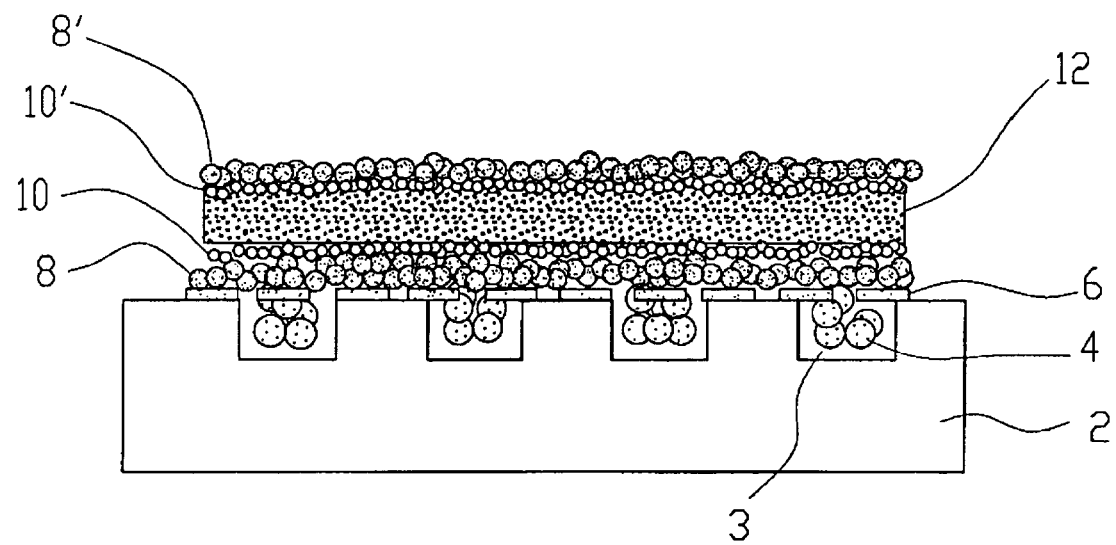
FIG. 14 is a cross-sectional schematic of the substrate in the manufacturing of the fuel cell according to an exemplary embodiment of the present invention.

FIG. 14 shows a cross-sectional schematic of the substrate 2 provided with the second gas diffusion layer 8'. The substrate 2 provided with the second gas diffusion layer 8' is moved from the table 28 to the belt conveyor BC1 and is carried to the discharging device 20j by the belt conveyor BC1.

(9) Second Electron Collection Layer Forming Step (S18)

Next, the second electron collection layer is formed on the substrate 2 provided with the second gas diffusion layer 8'. First, the substrate 2 carried to the discharging device 20j by the belt conveyor BC1 is mounted on the table 28 and is accommodated in the discharging device 20j. In the discharging device 20j, the second electron collection layer 6' is formed on the second gas diffusion layer 8' by the same step as the step performed in the discharging device 20d. As the material to form the second electron collection layer, the same material as the material to form the first electron collection layer can be used. The substrate 2 provided with the second electron collection layer 6' is moved from the table 28 to the belt conveyor BC1 and is carried to the discharging device 20k by the belt conveyor BC1.

(8) Second Supporting Member Applying Step (S19)

Next, the substrate 2 carried to the discharging device 20k by the belt conveyor BC1 is mounted on the table 28 and is accommodated in the discharging device 20k. The second supporting member is applied by the same step as the step performed in the discharging device 20c. As the material to form the second supporting member, the same material as the material to form the first supporting member can be used.

Figure 15:
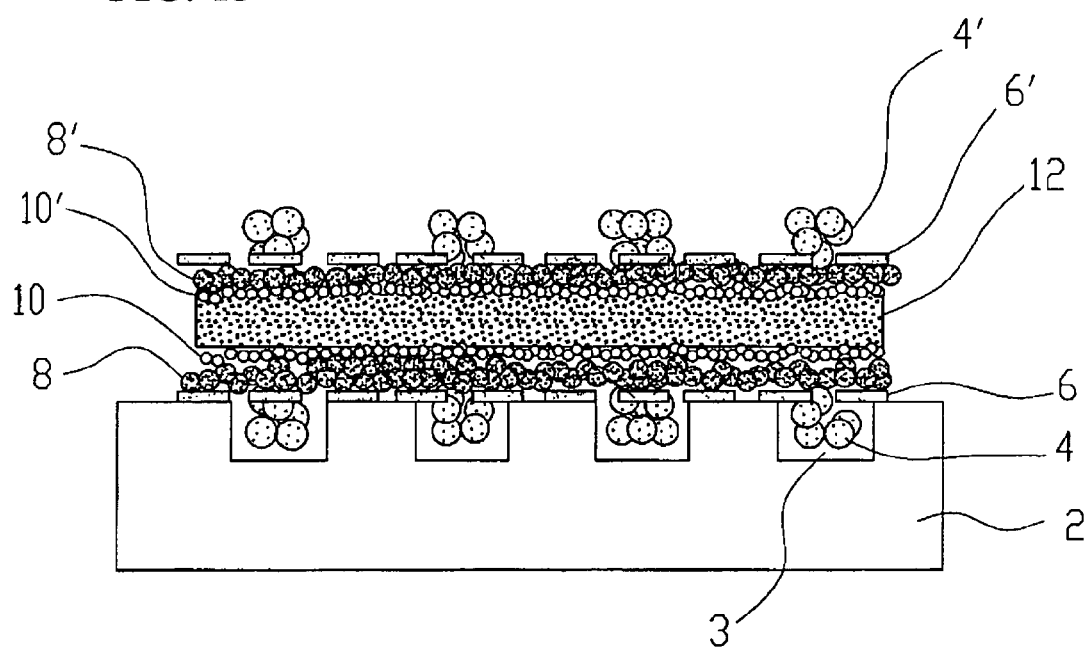
FIG. 15 is a cross-sectional schematic of the substrate in the manufacturing of the fuel cell according to an exemplary embodiment of the present invention.

FIG. 15 shows a cross-sectional schematic of the substrate 2 applied with the second electron collection layer 6' and the second supporting member 4'. The second supporting member 4' is formed on the second electron collection layer 6' and is applied at the location accommodated in the second gas flow path formed in the second substrate laminated on the substrate 2.

(9) Assembling Step (S20)

Next, the substrate 2 applied with the second supporting member 4' and the second substrate separately prepared and provided with the second gas flow path are laminated. The lamination of the substrate 2 (the first substrate) and the second substrate is performed by adhering them so that the second supporting member 4' formed on the substrate 2 is accommodated in the second gas flow path formed in the second substrate. Here, as the second substrate, the same substrate as the first substrate may be used. Also, the step to form the second gas flow path may be performed similar to the step to form the first gas flow path.

As mentioned above, the fuel cell having the structure shown in FIG. 1 can be manufactured. In the fuel cell shown in FIG. 1, the substrate 2' is positioned so that the U-shaped first gas flow path extended from one side to the other side in the substrate 2 is parallel with the second gas flow path formed in the substrate 2'.

In the method of manufacturing the fuel cell according to the above-mentioned exemplary embodiment, the discharging device is used in all the steps, but the fuel cell can be manufactured using the discharging device in any one of the steps of manufacturing the fuel cell. For example, the fuel cell may be manufactured by applying the material to form the electron collection layer using the discharging device to form the first electron collection layer and/or the second electron collection layer and by using the same steps as the related art step in the other steps. In this case, since the electron collection layer can be formed without using MEMS (Micro Electro Mechanical System), the cost of manufacturing the fuel cell can be lowered.

In the method of manufacturing the fuel cell according to the above-mentioned exemplary embodiment, the gas flow path is formed by forming the resist pattern on the substrate, applying hydrofluoric acid and performing the etching. But the gas flow path may be formed without forming the resist pattern. Also, the gas flow path may be formed by mounting the substrate in the fluoric gas atmosphere and discharging water at a predetermined location on the substrate.

In the method of manufacturing the fuel cell according to the above-mentioned exemplary embodiment, the fuel cell is manufactured by forming the composition portion of the fuel cell from the first substrate supplied with the first reaction gas and finally laminating the second substrate. But the manufacture of the fuel cell may be initiated in the side of the substrate supplied with the second reaction gas.

In the method of manufacturing the fuel cell according to the above-mentioned exemplary embodiment, the second supporting member is applied along the first gas flow path formed in the first substrate, but may be applied in the same direction as the direction cross the first gas flow path. For example, the second supporting member may be applied to be, perpendicular to the gas flow path formed in the first substrate, in the direction extending from right side to the left side in the FIG. 7(b). In this case, a fuel cell having a structure in which the second substrate is positioned so that the second gas flow path formed in the second substrate is perpendicular to the first gas flow path formed in the first substrate can be obtained.

In the method of manufacturing the fuel cell according to the above-mentioned exemplary embodiment, the first electron collection layer, the first reaction layer, the electrolyte film, the second reaction layer and the second electron collection layer are formed on the first substrate provided with the first gas flow path in order. But the fuel cell may be manufactured by forming the electron collection layer, the reaction layer and the electrolyte film on each of the first substrate and the second substrate and finally adhering the first substrate with the second substrate.

In addition, the fuel cell manufacturing line of the present exemplary embodiment, the first manufacturing line performing the step on the first substrate and the second manufacturing line performing the step on the second substrate are installed, and the manufacturing lines can be performed in parallel. Accordingly, since the step on the first substrate and the step on the second substrate can be performed in parallel, the fuel cell can be rapidly manufactured.

3) Electronic Apparatus and Vehicle

The electronic apparatus of an aspect of the present invention includes the fuel cell of an aspect of the present invention as the power supply source. As the electronic apparatus, there are, for example, a portable phone, a PHS, a mobile device, a notebook computer, a PDA (Personal Digital Assistant), a portable imaging phone. Also, the electronic apparatus of an aspect of the present invention may have other functions, such as a game function, a data communication function, a transcription playback function, and a dictionary function.

According to the electronic apparatus of an aspect of the present invention, clean energy considering the earth's environment may be equipped as the power supply source.

Figure 16:
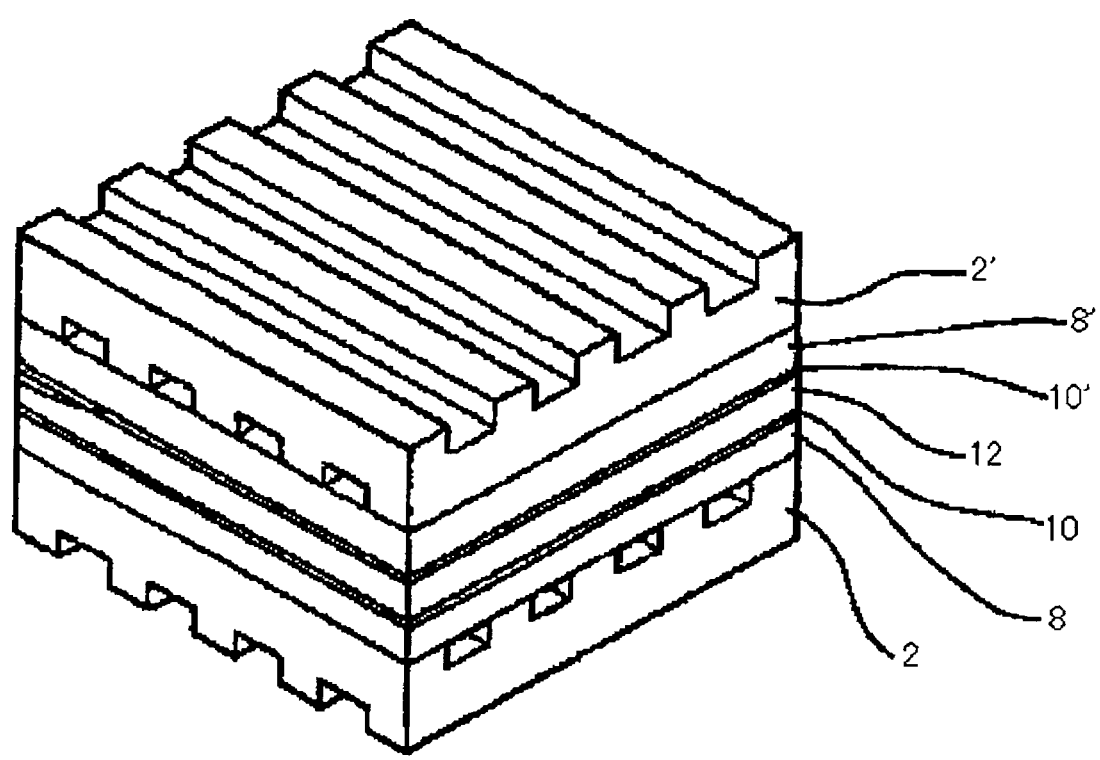
FIG. 16 illustrates a large fuel cell laminated with the fuel cell according to an exemplary embodiment of the present invention.

The vehicle of an aspect of the present invention includes the above-mentioned fuel cell as the power supply source. According to the manufacturing method of an aspect of the present invention, a large fuel cell may be manufactured by laminating a plurality of the fuel cells. That is, as shown in FIG. 16, the large fuel cell can be manufactured by forming the gas flow path on the back surface of the substrate 2' of the manufactured fuel cell and forming the gas diffusion layer, the reaction layer and the electrolyte film on the back surface of the substrate 2' provided with the gas flow path similar to the manufacturing step of the above-mentioned method of manufacturing the fuel cell and laminating the fuel cell.

According to the vehicle of an aspect of the present invention, clean energy adequately considering the earth's environment can be equipped as the power supply source.

What is claimed is:

1. A fuel cell, comprising:
   a first substrate provided with a gas flow path to supply a first reaction gas;
   a first electron collection layer formed on the first substrate;
   a first gas diffusion layer formed on the first electron collection layer;
   a first reaction layer formed on the first gas diffusion layer;
   an electrolyte film formed on the first reaction layer;
   a second reaction layer formed on the electrolyte film;
   a second gas diffusion layer formed on the second reaction layer;
   a second electron collection layer formed on the second gas diffusion layer; and
   a second substrate provided with a second gas flow path to supply a second reaction gas,
   at least one of the first electron collection layer and the second electron collection layer constructed in porous form by stacking conductive material particles, the conductive material particles having at least one of a particle shape, an elliptical shape, and a cylindrical shape; and
   the at least one of the first electron collection layer and the second electron collection layer including a plurality of rows, with the conductive material particles in each row separated by gaps, a conductive material particle in one row being in contact with a conductive material particles in an adjacent row.

2. The fuel cell according to claim 1,
   at least one of the first reaction layer and the second reaction layer constructed by stacking metal particles.

3. A method of manufacturing a fuel cell, comprising:
   forming a first gas flow path to supply a first reaction gas in a first substrate;
   forming a first electron collection layer to collect electrons generated by reacting the first reaction gas supplied through the first gas flow path;
   forming a first gas diffusion layer on the first electron collection layer;
   forming a first reaction layer to react the first reaction gas supplied through the first gas flow path with a catalyst;
   forming an electrolyte film;
   forming a second gas flow path to supply a second reaction gas in a second substrate;
   forming a second electron collection layer supplying electrons with which a second reaction gas supplied through the second gas flow path reacts; and
   forming a second reaction layer to react a second reaction gas supplied through the second gas flow path with catalyst, and
   forming a second gas diffusion layer on the second reaction layer;
   at least one of the first electron collection layer forming and the second electron collection layer forming includes forming the electron collection layer in porous form by stacking conductive material particles, the conductive material particles having at least one of a particle shape, an elliptical shape, and a cylindrical shape, to form the electron collection layer onto the first substrate or the second substrate at predetermined intervals, the predetermined intervals forming a desired pattern.

4. The method according to claim 3,
   the material to form the electron collection layer applied using a discharging device.

5. The method according to claim 3,
   at least one of the first reaction layer forming and the second reaction layer forming including forming the reaction layer by applying material to form the reaction layer onto the first substrate or the second substrate at predetermined intervals.

6. The method according to claim 3,
   the material to form the reaction layer applied using a discharging device.

7. An electronic apparatus, comprising:
   the fuel cell according to claim 1 as a power supply source.

8. A vehicle, comprising:
   the fuel cell according to claim 1 as a power supply source.

9. The method according to claim 4,
   the discharging device being an inkjet discharging device.

10. The method according to claim 6,
    the discharging device being an inkjet discharging device.

* * * * *

UNITED STATES PATENT AND TRADEMARK OFFICE
CERTIFICATE OF CORRECTION

PATENT NO. : 7,494,741 B2  Page 1 of 1
APPLICATION NO. : 10/806160
DATED : February 24, 2009
INVENTOR(S) : Hirotsuna Miura and Yasunori Yamazaki It is certified that error appears in the above-identified patent and that said Letters Patent is hereby corrected as shown below:

Please amend the title page as follows:

Item (54), please change "FUEL CELL WITH A POROUS ELECTRON COLLECTION LAYER FORMED BY STACKING CONDUCTIVE MATERIAL PARTICLES" to --FUEL CELL, METHOD OF MANUFACTURING THE SAME, ELECTRONIC APPARATUS AND VEHICLE--.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,494,741 B2
APPLICATION NO. : 10/806160
DATED : February 24, 2009
INVENTOR(S) : Hirotsuna Miura and Yasunori Yamazaki It is certified that error appears in the above-identified patent and that said Letters Patent is hereby corrected as shown below:

Please amend the title page, Item (54) and at Column 1, lines 1-4, title, as follows:

Please change "FUEL CELL WITH A POROUS ELECTRON COLLECTION LAYER FORMED BY STACKING CONDUCTIVE MATERIAL PARTICLES" to --FUEL CELL, METHOD OF MANUFACTURING THE SAME, ELECTRONIC APPARATUS AND VEHICLE--.

This certificate supersedes the Certificate of Correction issued February 9, 2010.

Signed and Sealed this

Ninth Day of March, 2010

David J. Kappos
*Director of the United States Patent and Trademark Office*